United States Patent
Seresini

(10) Patent No.: US 7,061,386 B2
(45) Date of Patent: Jun. 13, 2006

(54) AIR FRESHENER DISPENSER EQUIPPED WITH AN INDICATOR CIRCUIT FOR INDICATING AN INCOMING CALL ON A NEARBY CELLULAR TELEPHONE

(75) Inventor: Carlo Seresini, Viadana (IT)

(73) Assignees: Misal Arexons S.p.A., Rome (IT); Ototop S.r.l., Viadana (IT)

( * ) Notice: Subject to any disclaimer, the term of this patent is extended or adjusted under 35 U.S.C. 154(b) by 347 days.

(21) Appl. No.: 10/734,827

(22) Filed: Dec. 12, 2003

(65) Prior Publication Data

US 2004/0263343 A1 Dec. 30, 2004

(30) Foreign Application Priority Data

Jun. 27, 2003 (IT) .......................... TO2003A0489

(51) Int. Cl.
*G08B 17/12* (2006.01)
(52) U.S. Cl. ............... 340/600; 340/691.1; 340/654; 455/228; 455/344; 455/899
(58) Field of Classification Search ............ None
See application file for complete search history.

(56) References Cited

U.S. PATENT DOCUMENTS

| 4,816,973 | A | * | 3/1989 | Atalla et al. ................. 362/643 |
| D357,330 | S | * | 4/1995 | Wong et al. ................. D26/51 |
| D382,051 | S | * | 8/1997 | Doppes ..................... D23/367 |
| 6,644,507 | B1 | * | 11/2003 | Borut et al. .................. 222/37 |
| 6,863,704 | B1 | * | 3/2005 | Pillion et al. ................. 55/471 |
| 2004/0203412 | A1 | * | 10/2004 | Greco et al. ............... 455/66.1 |

FOREIGN PATENT DOCUMENTS

| DE | 19754468 A1 | * | 5/1999 |
| GB | 2380090 A | * | 3/2003 |
| WO | WO 2004105816 A1 | * | 12/2004 |

* cited by examiner

*Primary Examiner*—Benjamin C. Lee
(74) *Attorney, Agent, or Firm*—Frommer Lawrence & Haug LLP; Ronald R. Santucci

(57) ABSTRACT

There is described an air freshener dispenser, in particular of the type fittable to vehicle air inlets, which has an indicator circuit for indicating an incoming call on a cellular telephone in the vicinity of the air freshener dispenser.

9 Claims, 1 Drawing Sheet

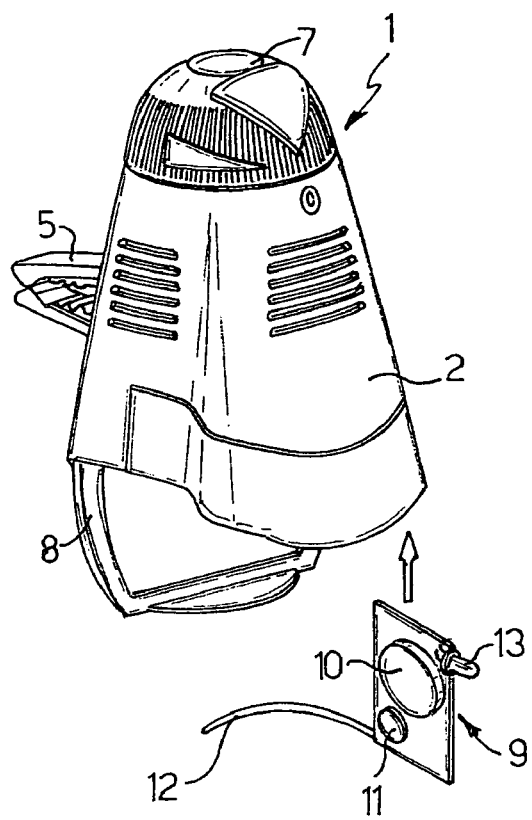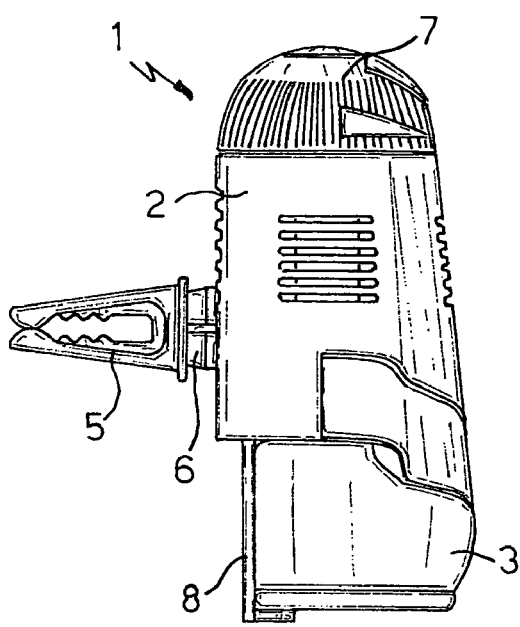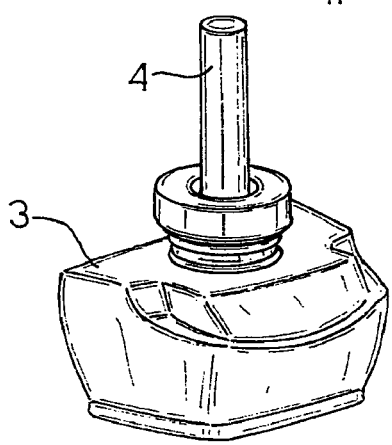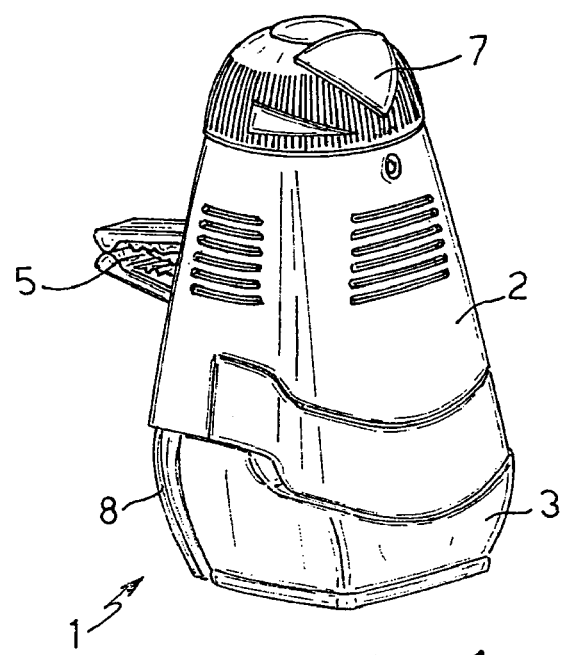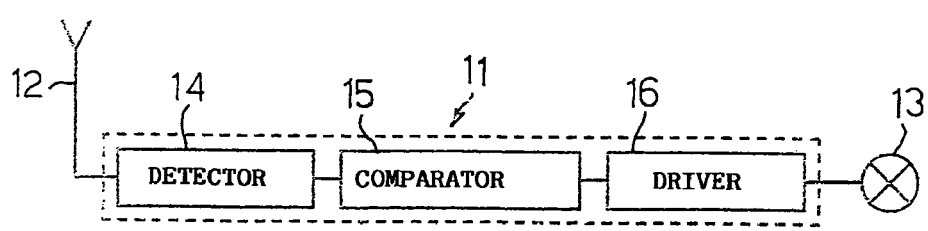

AIR FRESHENER DISPENSER EQUIPPED WITH AN INDICATOR CIRCUIT FOR INDICATING AN INCOMING CALL ON A NEARBY CELLULAR TELEPHONE

This application claims priority benefits of Italian patent application number TO2003A 000489 filed Jun. 27, 2003.

The present invention relates to an air freshener dispenser equipped with an indicator circuit for indicating an incoming call on a nearby cellular telephone. The term "dispenser" is intended to mean any device or member designed to emit air freshening substances into the surrounding environment.

The present invention may be used to particular advantage, though not exclusively, in air freshener dispensers of the type designed to fit to vehicle air inlets, to which the following description refers purely by way of example.

BACKGROUND OF THE INVENTION

As is known, in recent years, cellular telephones have become so widely used as to now form part of so-called mass technology, and are therefore also frequently used in vehicles by both drivers and passengers.

As is also known, various factors contribute towards making the passenger compartment of a vehicle fairly noisy. Some are related to normal operation of the vehicle, such as engine noise, and others to operation of devices which now form part of standard equipment on mass-produced vehicles, such as car radios.

All these noise sources make it difficult to hear incoming calls on a cellular telephone inside the passenger compartment of the vehicle, by partly or completely drowning out the sound of the ringer. The problem is further compounded when, as often happens, the cellular telephone is placed inside a receptacle in the passenger compartment or inside a handbag, or is set to indicate incoming calls by means of vibration (vibracall).

SUMMARY OF THE INVENTION

It is an object of the present invention to eliminate the aforementioned drawbacks.

According to the present invention, there is provided an air freshener dispenser, as claimed in claim 1.

BRIEF DESCRIPTION OF THE DRAWINGS

A preferred, non-limiting embodiment of the present invention will be described by way of example with reference to the accompanying drawings, in which:

FIG. 1 shows a view in perspective of a commonly marketed air freshener dispenser;

FIG. 2 shows a side view of the FIG. 1 air freshener dispenser;

FIG. 3 shows an exploded view in perspective of an air freshener dispenser in accordance with the present invention;

FIG. 4 shows a block diagram of an incoming telephone call indicator circuit forming part of the FIG. 3 air freshener dispenser.

DETAILED DESCRIPTION OF THE INVENTION

FIGS. 1 and 2 show a commonly marketed air freshener dispenser, in particular of the type designed to fit to the air inlets of a vehicle.

The dispenser, indicated as a whole by 1, comprises a hollow, substantially bell-shaped supporting body 2 made of partly transparent plastic material and having air slots; and a bottle 3 containing an air freshening substance, and which clicks releasably onto body 2.

A wick 4 projects partly from bottle 3, and has a bottom portion immersed inside the air freshening substance, and a top portion extending inside body 2, at the air slots.

More specifically, body 2 has a rear clip 5 connected to body 2 by a spherical joint 6, so that dispenser 1 can be clipped onto both vertical and horizontal air inlet fins; a rounded top cap 7 with integral fins (not shown) extending inside body 2, at the air slots, to adjust air flow through the slots and over wick 4, and therefore the speed at which the air freshening substance is dispensed, by rotating cap 7; and a bottom retaining member 8 for retaining bottle 3.

As shown in FIG. 3, according to the present invention, dispenser 1 in FIGS. 1 and 2 also has a printed circuit 9 housed inside body 2—in particular, in a seat (not shown) formed in body 2—and for detecting and indicating an incoming call on a cellular telephone (not shown) in the immediate vicinity of dispenser 1.

More specifically, circuit 9 comprises:

a power battery 10, conveniently a flat lithium type;

an integrated circuit 11, e.g. of the DY3189 type marketed by the Applicant, OTOTOP S.r.l., to detect an incoming telephone call in the immediate vicinity of integrated circuit 11 itself, and having a wire receiving aerial 12, i.e. defined by a flexible metal wire, e.g. copper, enclosed in a protective sheath; and a light-emitting diode (LED) 13 driven by integrated circuit 11.

More specifically, as shown in FIG. 4, integrated circuit 11 comprises:

an electromagnetic field detecting stage 14 connected to aerial 12 and supplying an electric signal of an amplitude related to the intensity of the electromagnetic field at aerial 12;

a comparing stage 15, which receives the electric signal from electromagnetic field detecting stage 14, compares the electric input signal with a predetermined threshold value, and supplies a logic output signal which assumes a first logic level, e.g. high, indicating the presence of an incoming call on the cellular telephone, when the electric input signal is above the threshold value, and a second logic level, e.g. low, indicating no incoming call on the cellular telephone, when the electric input signal is at or below the threshold value; and a driver stage 16, which receives the logic signal from comparing stage 15, and supplies a drive signal to light-emitting diode 13 to cause it to flash in the event of an incoming call on the cellular telephone.

More specifically, to ensure user sighting of the light signal indicating an incoming call on the cellular telephone, driver stage 16 is designed for prolonged flashing of light-emitting diode 13, e.g. thirty-two flashes.

To ensure detection of an incoming call on a cellular telephone anywhere within the vehicle passenger compartment, electromagnetic field detecting stage 14 is designed with an operating range of about 1.5 m.

To avoid spurious light signals, electromagnetic field detecting stage 14 is designed to only detect electromagnetic fields with frequencies in cellular telephone frequency bands, which are currently around 800 MHz, 900 MHz and 1800 MHz.

Indicator circuit 9 operates as follows.

Electromagnetic field detecting stage 14 detects the electromagnetic field in the region of indicator circuit 9, and generates an appropriately conditioned (amplified and filtered) electric output signal proportional to the intensity of the electromagnetic field.

If the electromagnetic field in the region of indicator circuit 9 is above a given threshold value, the logic signal supplied by comparing stage 15 assumes a high logic level indicating an incoming call on a cellular telephone in said region, and driver stage 16 accordingly flashes light-emitting diode 13 to signal the incoming telephone call to the user.

Conversely, if the electromagnetic field in the region of indicator circuit 9 is below the threshold value, the logic signal supplied by comparing stage 15 assumes a low logic level indicating no incoming telephone call, and light-emitting diode 13 is not flashed by driver stage 16.

The advantages of the air freshener dispenser according to the present invention will be clear from the foregoing description.

Particularly obvious is the advantage of employing a simple device, ordinarily provided in a vehicle passenger compartment for other purposes, to solve a problem commonly encountered using cellular telephones inside the passenger compartment.

Moreover, printed circuit 9 is thin enough to be located anywhere between body 2 and bottle 3 of dispenser 1.

Clearly, changes may be made to the air freshener dispenser as described and illustrated herein without, however, departing from the scope of the present invention as defined by the accompanying Claims.

The invention claimed is:

1. An air freshener dispenser (1), comprising indicator means (9) for indicating an incoming telephone call on a portable communication device in the vicinity of the air freshener dispenser (1).

2. An air freshener dispenser as claimed in claim 1, wherein said indicator means comprise:
   electromagnetic field detecting means (12, 14);
   comparing means (15) for comparing the intensity of the electromagnetic field, detected by said electromagnetic field detecting means (12, 14), with a threshold value; and
   signalling means (13, 16) for signalling an incoming telephone call on said portable communication device, when the intensity of the electromagnetic field detected by said electromagnetic field detecting means (12, 14) is above said threshold value.

3. An air freshener dispenser as claimed in claim 2, wherein said signalling means (13, 16) comprise light signalling means (13).

4. An air freshener dispenser as claimed in claim 3, wherein said light signalling means comprise a light-emitting diode (13).

5. An air freshener dispenser as claimed in claim 3, wherein said signalling means (13, 16) also comprise:
   driver means (16) for flashing said light signalling means (13) in the event of an incoming telephone call.

6. An air freshener dispenser as claimed in claim 2, wherein said electromagnetic field detecting means (12, 14) comprise a wire aerial (12).

7. An air freshener dispenser as claimed in claim 1, wherein it is fittable to vehicle air inlets.

8. An air freshener dispenser as claimed in claim 7, and comprising a body (2) having a rear clip (5) connected to the body (2) by a spherical joint (6) to enable the dispenser to be clipped onto both vertical and horizontal air inlet fins.

9. An air freshener dispenser as claimed in claim 8, and also comprising a bottle (3) containing an air freshening substance and releasably to the body (2) of the air freshener dispenser.

* * * * *